Nov. 11, 1941.        D. H. SHEPHERD              2,262,345
              CARRIER FOR CANS AND THE LIKE
                 Filed Feb. 27, 1940          2 Sheets-Sheet 1
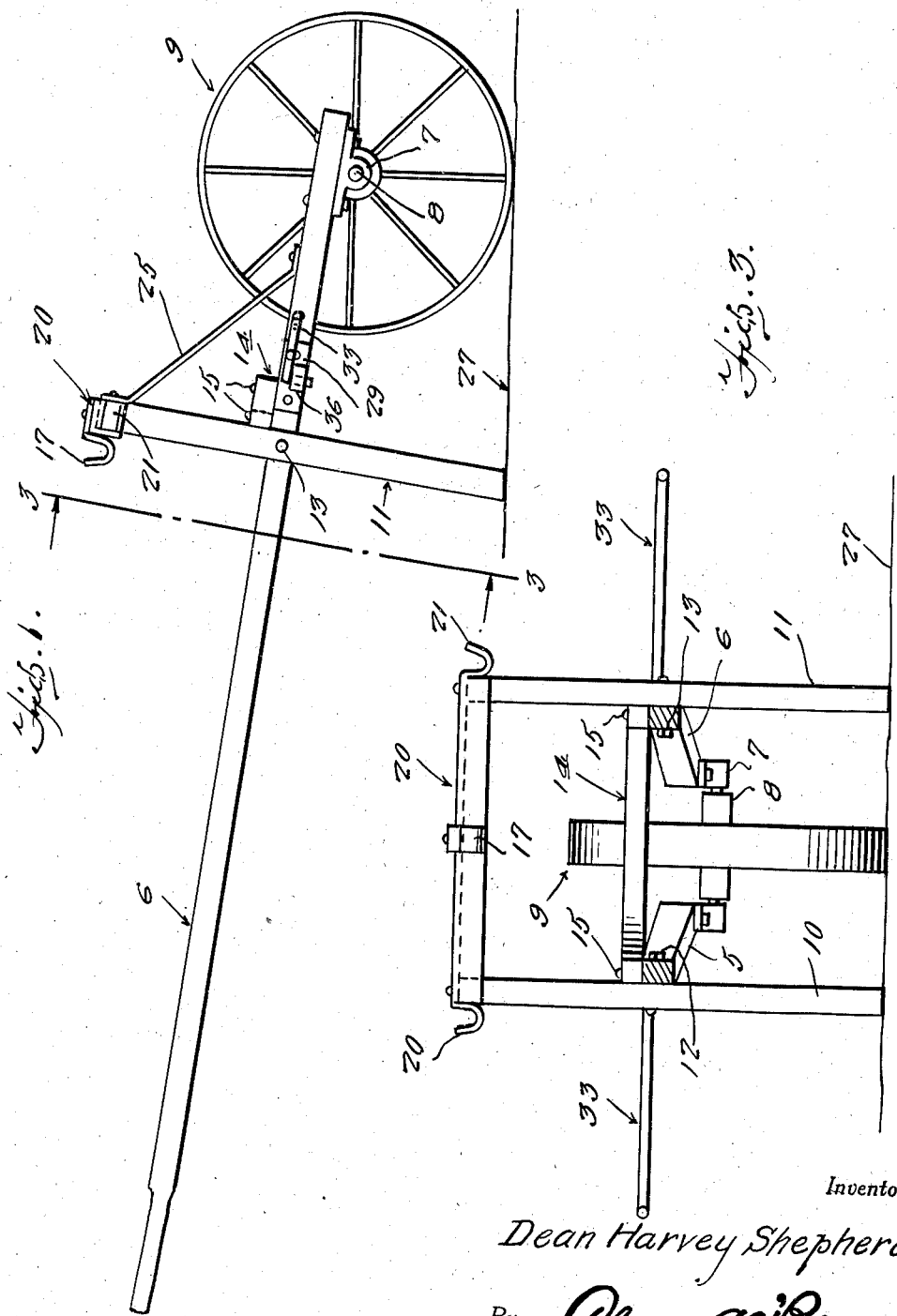
Inventor
Dean Harvey Shepherd
By Clarence A. O'Brien
Attorney

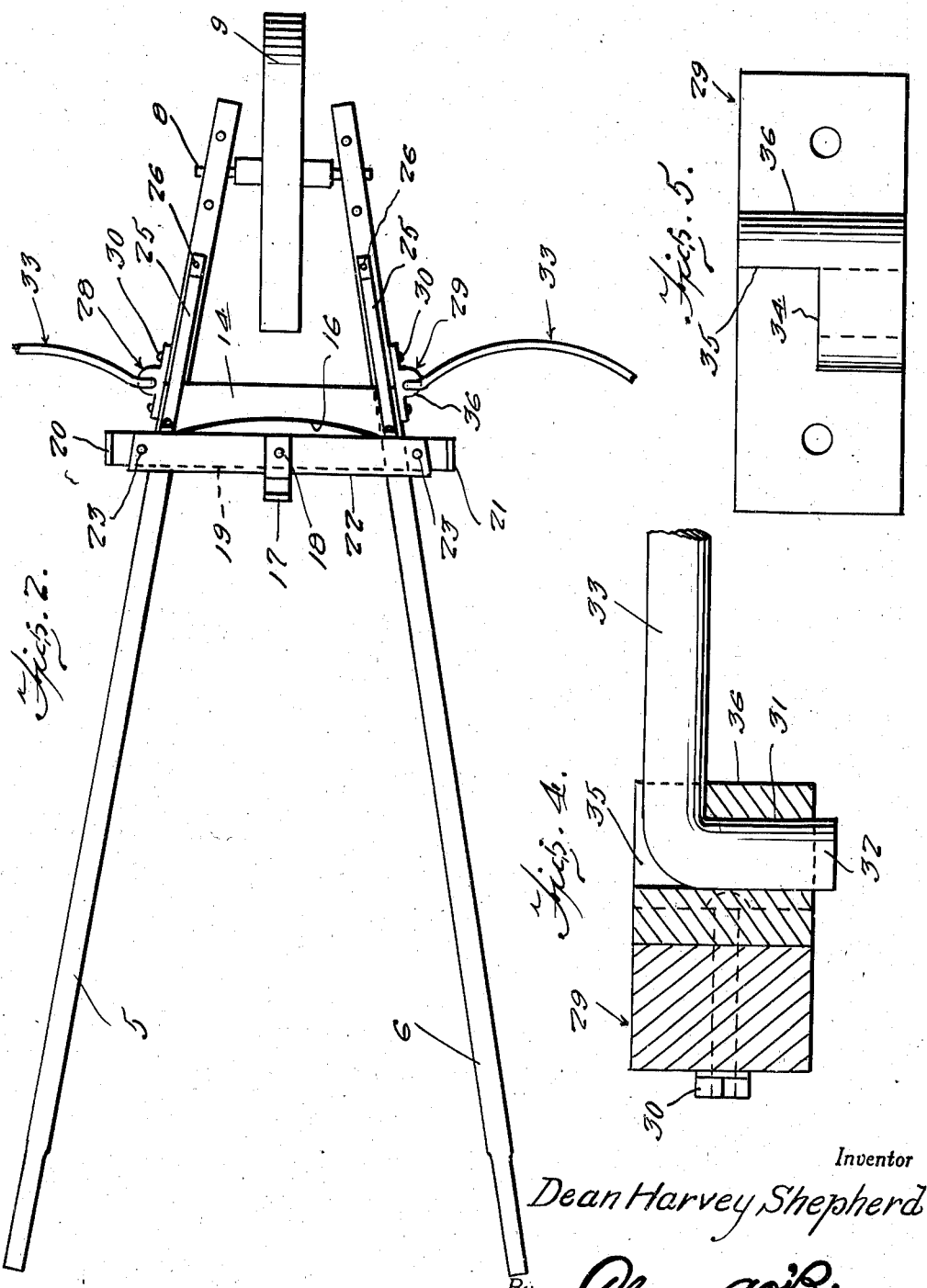

Patented Nov. 11, 1941

2,262,345

UNITED STATES PATENT OFFICE 2,262,345

CARRIER FOR CANS AND THE LIKE

Dean Harvey Shepherd, Bloom, Wis.

Application February 27, 1940, Serial No. 321,120

7 Claims. (Cl. 214—65.4)

My invention relates generally to means for lifting and carrying cans and the like, and particularly to an arrangement of this character which is especially, although not necessarily, adapted to lifting milk cans from the floor in a dairy and carrying a number of them easily and conveniently to a remote point, and an important object of my invention is to provide a simple, inexpensive, and efficient arrangement of this character.

Other important objects and advantages of my invention will be apparent from a reading of the following description taken in connection with the drawings, wherein for purposes of illustration, a preferred embodiment of my invention is shown.

In the drawings:

Figure 1 is a general right hand side elevational view of the embodiment.

Figure 2 is a top plan view thereof.

Figure 3 is a transverse vertical sectional view taken through Figure 1 approximately on the line 3—3, and looking toward the right in the direction of the arrows.

Figure 4 is an enlarged transverse vertical sectional view taken through one of the arm bearings.

Figure 5 is an outboard elevational view of one of the said bearings.

Referring in detail to the drawings, the numerals 5 and 6 refer respectively to elongated handles, similar to wheel-barrow handles which have attached to the under side of the forward ends thereof the axle bearings 7 in which turn the opposite ends of the axle 8 of the wheel 9 which is thereby rotatably disposed between the front or forward ends of the handles. To the rear of the wheel 9 at a suitable distance therefrom are standards 10 and 11 which are substantially parallel and extend above and below the handles 5 and 6 and are attached to the outboard sides of the said handles as indicated in Figure 3 by means of bolts 12 and 13, respectively. Immediately forward of these standards is the horizontal cross member 14 which is attached to the upper side of the handles by bolts or the like 15. The rear edge of the cross member 14 is concaved as indicated by the numeral 16 to conformably engage the side of a milk can or the like (not shown) which has one of its side handles suspended on the flat rearwardly extending hook 17 which is bolted or otherwise suitably secured as indicated by the numeral 18 to the top of the middle of an upper cross member 19 which extends between and is connected to the upper ends of the standards 10 and 11. Other laterally extending hooks 20 and 21, respectively, extend from the opposite ends of the cross member 19, and these hooks depend from the opposite end portions of the horizontal flange of the angle iron 22 which lies along the top of the standards 10 and 11 and is connected thereto by means of bolts or the like 23. The hook 17 is fastened to the middle of the horizontal flange of the said angle iron, while diagonal braces 25 have their upper ends secured to the forward face or edge of the corresponding standards 10 and 11 below the angle iron, and have their depressed ends secured as indicated by the numerals 26 to forward portions of the handles 5 and 6.

The diameter of the wheel 9 and the height of the standards 10 and 11, and the point of their connection with the handles 5 and 6 are so proportioned that while the lower ends of the standards are resting on the ground or other supporting surface 27, the various hooks will be in a position and at an elevation to engage under the handles of the milk cans or the like (not shown) so that when the operator of the device lifts up on the free ends of the handles 5 and 6 the cans or the like will be lifted from the ground 27 and may be transported from their original location by wheeling the device in the manner of a wheel barrow.

Attached to the outboard sides of handles 5 and 6 at a short distance forward of the standards are the bearings 28 and 29 each of which preferably comprises a single block of metal with flanges attached as indicated by the numeral 30 to the handles, with the substantially semicircular middle portion thereof provided with a vertical bore 31 in which turns a pintle 32 on the laterally inward end of the curved retainer arm 33 which can extend laterally outwardly in the position illustrated in Figure 2 of the drawings so as to bear against the sides of the cans supported on the hooks 20 and 21 and prevent their dislodgement therefrom during the wheeling of the carrier. The horizontal portions of the arms 33 rest on the lower horizontal surface 34 of a cut away portion 35 of the cylindrical portion 36 of the bearing as shown in Figure 5 so as to be supported at the proper elevation, and so as to engage the shoulder 35 as a stop against further forward swinging, while being permitted to be swung laterally rearwardly and out of the way while the carrier is not in use. It is obvious that with the cans suspended on each of the hooks described, another can may be rested in a horizontal position on the handles 5 and 6 behind the middle can, so that four full size milk cans can be easily and readily and conveniently transported from one location to another by means of the device of the invention. By reason of these capabilities, the device makes the operation of transfer of cans and other packages in dairies and other places, a much more efficient and easily performed operation.

Although I have shown and described herein a preferred embodiment of my invention, I do not wish to limit the application to the precise structural details and arrangements described and shown, except as may be required by the scope of the subjoined claims.

Having described the invention, what is claimed as new is:

1. A carrier for milk cans and the like, said carrier comprising handle means, a ground engaging wheel supporting the forward part of said handle means, a foot depending from said handle means at a point to the rear of said wheel for resting on the ground, a standard on said handle means and rising thereabove, and oppositely laterally projecting hook means on the upper part of said standard for hooking under upper portions of the cans and the like to lift and carry the cans with the inner sides of the cans bearing against the outer sides of said handle means when the rear part of said handle means is elevated so as to bring said foot off the ground.

2. A carrier for milk cans and the like, said carrier comprising handle means, a ground engaging wheel supporting the forward part of said handle means, a foot depending from said handle means at a point to the rear of said wheel for resting on the ground, a standard on said handle means and rising thereabove, and hook means on opposite sides of the upper part of said standard for hooking under upper portions of the cans and the like to lift and carry the cans with the inner sides of the cans bearing against the outer sides of said handle means when the rear part of said handle means is elevated so as to bring said foot off the ground, and projecting laterally from the opposite sides of said handle means for holding the cans or the like in place on said hook means.

3. A carrier for milk cans and the like, said carrier comprising handle means, a ground engaging wheel supporting the forward part of said handle means, a foot depending from said handle means at a point to the rear of said wheel for resting on the ground, a standard on said handle means and rising thereabove, and hook means on the opposite sides of the upper part of said standard for hooking under portions of the cans and the like to lift and carry the cans when the rear part of said handle means is elevated so as to bring said foot off the ground, said upper part of the standard comprising a cross member, said hook means comprising a hook at each end of said cross member, a third hook supported by said cross member intermediate its ends for similarly carrying another can or the like.

4. A carrier for milk cans and the like, said carrier comprising handle means, a ground engaging wheel supporting the forward part of said handle means, a foot depending from said handle means at a point to the rear of said wheel for resting on the ground, a standard on said handle means and rising thereabove, and hook means projecting laterally from the upper part of said standard for hooking under portions of the cans and the like to lift and carry the cans on opposite sides of said handle means when the rear part of said handle means is elevated so as to bring said foot off the ground, said hook means comprising a hook at the outer end of the upper part of the standard, a third hook supported by said standard between the mentioned hooks for similarly carrying another can or the like, said handle means comprising a pair of laterally spaced handle bars, a cross member connected to and between said handle bars forwardly of said third hook, said cross member having its rear side concaved to conformably engage the front side of a can or the like suspended on said third hook.

5. A carrier for milk cans, said carrier comprising a pair of laterally spaced handle bars, a ground engaging wheel supporting the front ends of the handle bars, a standard secured intermediate its ends to each handle bar to the rear of the wheel, said standards rising above and depending below the handle bars to engage the ground, a spacer bar connected to extend between the handle bars adjacent said standards, a cross member connected to and between the upper ends of the standards, a lateral hook on each end of said cross member to lift and carry cans at the outer sides of the handle bars when the lower ends of the standards are raised off the ground, and a third hook extending rearwardly from an intermediate part of said cross member for similarly lifting and carrying a can between the handle bars.

6. A carrier for milk cans, said carrier comprising a pair of laterally spaced handle bars, a ground engaging wheel supporting the front ends of the handle bars, a standard secured intermediate its ends to each handle bar to the rear of the wheel, said standards rising above and depending below the handle bars to engage the ground, a spacer bar connected to extend between the handle bars adjacent said standards, a cross member connected to and between the upper ends of the standards, a lateral hook on each end of said cross member to lift and carry cans at the outer sides of the handle bars when the lower ends of the standards are raised off the ground, and a third hook extending rearwardly from an intermediate part of said cross member for similarly lifting and carrying a can between the handle bars, lateral arms projecting from the handle bars for engagement by the forward sides of the cans to hold the cans in place on the lateral hooks while the standards are off the ground.

7. A carrier for milk cans, said carrier comprising a pair of laterally spaced handle bars, a ground engaging wheel supporting the front ends of the handle bars, a standard secured intermediate its ends to each handle bar to the rear of the wheel, said standards rising above and depending below the handle bars to engage the ground, a spacer bar connected to extend between the handle bars adjacent said standards, a cross member connected to and between the upper ends of the standards, a lateral hook on each end of said cross member to lift and carry cans at the outer sides of the handle bars when the lower ends of the standards are raised off the ground, and a third hook extending rearwardly from an intermediate part of said cross member for similarly lifting and carrying a can between the handle bars, lateral arms projecting from the handle bars for engagement by the forward sides of the cans to hold the cans in place on the lateral hooks while the standards are off the ground, said arms being pivoted to swing rearwardly to lie along the handle bars when not in use, and means to limit the forward swing of said arms beyond can holding position.

DEAN HARVEY SHEPHERD.